(12) United States Patent
Guen

(10) Patent No.: US 9,853,281 B2
(45) Date of Patent: Dec. 26, 2017

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 51 days.

(21) Appl. No.: 14/534,497

(22) Filed: Nov. 6, 2014

(65) Prior Publication Data

US 2015/0236333 A1    Aug. 20, 2015

(30) Foreign Application Priority Data

Feb. 14, 2014    (KR) .................. 10-2014-0017125

(51) Int. Cl.
| | | |
|---|---|---|
| *H01M 2/34* | (2006.01) | |
| *H01M 2/04* | (2006.01) | |
| *H01M 2/02* | (2006.01) | |

(52) U.S. Cl.
CPC ............ *H01M 2/345* (2013.01); *H01M 2/02* (2013.01); *H01M 2/0202* (2013.01);
(Continued)

(58) Field of Classification Search
CPC ...... H01M 2/345; H01M 2/02; H01M 2/0237; H01M 2/0202; H01M 2/043;
(Continued)

(56) References Cited

U.S. PATENT DOCUMENTS

2011/0183197 A1*  7/2011  Byun .................. H01M 2/04
                                                    429/185
2011/0305929 A1   12/2011  Byun
(Continued)

FOREIGN PATENT DOCUMENTS

EP         2 348 559 A1    7/2011
KR      2002-0021888 A     3/2002
(Continued)

OTHER PUBLICATIONS

Extended European Search Report for 14196692.9 dated Jun. 16, 2015; Guen.

*Primary Examiner* — Osei Amponsah
(74) *Attorney, Agent, or Firm* — Lee & Morse, P.C.

(57) ABSTRACT

A secondary battery includes a first electrode plate and a second electrode plate, a case accommodating the electrode plates, and a cap assembly to seal the case. The cap assembly has a short-circuit hole and a cap plate electrically connected to the first electrode plate. The battery also includes an inversion plate spaced from a short-circuit plate. The inversion plate is positioned in or over the short-circuit hole and bent toward the case. The short-circuit plate is electrically connected to the second electrode plate. When an internal pressure of the battery exceeds a value, the inversion plate moves to contact the short-circuit plate, which, in turn, breaks a fuse. A groove is included in the gap assembly adjacent the short-circuit plate. When the inversion plate moves under excessive pressure, an edge portion of the gap assembly deforms away from the short-circuit plate.

10 Claims, 4 Drawing Sheets

(52) U.S. Cl.
CPC ........... *H01M 2/0237* (2013.01); *H01M 2/04* (2013.01); *H01M 2/043* (2013.01); *H01M 2/0404* (2013.01); *H01M 2200/20* (2013.01); *H01M 2220/20* (2013.01); *H01M 2220/30* (2013.01)

(58) Field of Classification Search
CPC .. H01M 2/0404; H01M 2/04; H01M 2220/20; H01M 2220/30
USPC .................................... 429/185, 61
See application file for complete search history.

(56) References Cited

U.S. PATENT DOCUMENTS

2013/0071704 A1* 3/2013 Byun ................... H01M 2/043
429/61
2013/0130072 A1    5/2013 Guen

FOREIGN PATENT DOCUMENTS

| KR | 10-2011-0134844 A | 12/2011 |
| KR | 10-2013-0054845 A | 5/2013 |

* cited by examiner

SECONDARY BATTERY

CROSS-REFERENCE TO RELATED APPLICATION

Korean Patent Application No. 10-2014-0017125, filed on Feb. 2, 2014, and entitled, "Secondary Battery," is incorporated by reference herein in its entirety.

BACKGROUND

1. Field

One or more embodiments described herein relate to a secondary battery.

2. Description of the Related Art

Unlike primary batteries, secondary batteries are rechargeable. One example of a secondary battery is a low capacity battery which includes a battery cell. A battery of this type may be used for small portable electronic devices such as cellular phones and camcorders. In contrast, a high capacity battery includes dozens of connected battery cells. A battery of this type may be used as a motor-driving power source for electric scooters, hybrid vehicles, or electric vehicles.

Secondary batteries have been manufactured in cylindrical and prismatic shapes. These batteries may include an electrode assembly formed by disposing an insulating separator between a positive electrode plate and a negative electrode plate. The assembly is placed in a case together with an electrolyte solution, and a cap assembly having electrode terminals is disposed on the case.

SUMMARY

In accordance with one embodiment, a secondary battery includes an electrode assembly including a first electrode plate and a second electrode plate; a case accommodating the electrode assembly; a cap assembly to seal the case, the cap assembly having a short-circuit hole and a cap plate electrically connected to the first electrode plate; an inversion plate including an inversion section positioned in the short-circuit hole and bent toward the case, and an edge section at an edge of the inversion section and coupled to the cap plate; and a short-circuit plate adjacent the short-circuit hole and spaced from the cap plate, the short-circuit plate electrically connected to the second electrode plate, wherein the cap assembly includes a groove adjacent to and spaced from the short-circuit hole, the groove to allow for deformation of a portion of the cap assembly when the inversion plate is inverted.

The groove may be spaced from a region at which the cap assembly is coupled to an edge part of the inversion plate. A depth of the groove may be about half or less of a thickness of the cap assembly. The groove may have a shape which substantially conforms with the short-circuit hole. The groove may be on a top surface of the cap assembly.

The cap assembly may include a coupling region in contact with the inversion plate, and the coupling region may deform to face the case when the inversion plate is inverted, the coupling region allowed to deform based on the groove. The coupling region may be welded and coupled to the inversion plate.

The inversion plate may include a surface having a notch coupled to the cap assembly. The notch may be on a surface of the inversion plate contacting the cap assembly. The short-circuit plate may include a protrusion which protrudes from a surface facing the inversion plate. The protrusion may contact the inversion plate when the inversion plate is inverted. The secondary battery may include an air hole between the inversion plate and the short-circuit plate, wherein the air hole is in an insulation member adjacent the short-circuit plate.

In accordance with another embodiment, a battery includes a first terminal; a second terminal; a fuse connected to the first terminal; a first plate connected to the second terminal; and a second plate spaced from the first plate, wherein the second plate moves to contact the first plate when an internal pressure of the battery exceeds a predetermined value, contact between the first and second plates to establish a short circuit between the first and second terminals, the short circuit between the first and second terminals breaking the fuse.

The second plate may have a concave curve relative to the first plate when the internal pressure of the battery is below the predetermined value, and the second plate may have a convex curve relative to the first plate when the internal pressure of the battery is above the predetermined value. The convex curve may be based on a ratio ($d\Delta\theta/d\Delta s$), where $\Delta\theta$ is an angle between tangents at a point on the convex curve of the second plate and a lowest point of the second plate 161 and $\Delta s$ is a distance along the curve from the point on the curve.

The second plate may overlap a gap in a surface under the first plate, and the second plate may deform an edge of the surface in a direction away from the first plate when the moves to contact the first plate.

The battery may include a groove adjacent the edge of the surface, wherein the groove allows a reduced force from the second plate to deform the edge of the surface. The groove may have a depth which is substantially equal to or greater than a thickness of the surface.

The battery may include a collector plate connected to the first terminal, wherein the collector plate has a first region having a first thickness and a second region having a second thickness less than the first thickness, and wherein the fuse corresponds to the second region of the collector plate. The battery may include at least one protrusion extending from a surface of the first plate in a direction facing the second plate, the at least one protrusion contacting the second plate when the second plate moves.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
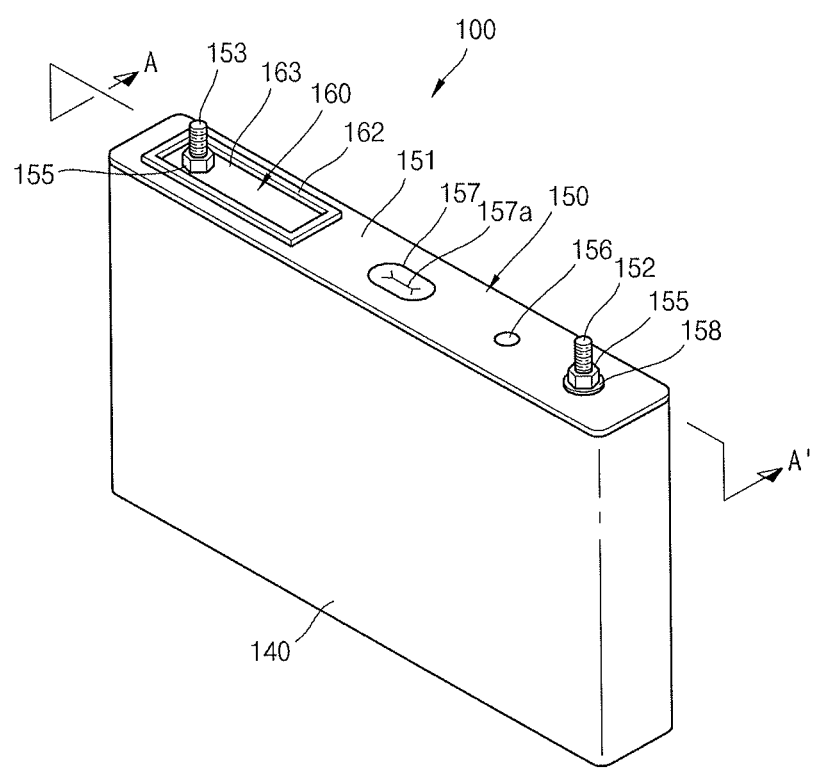
FIG. 1 illustrates an embodiment of a secondary battery.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
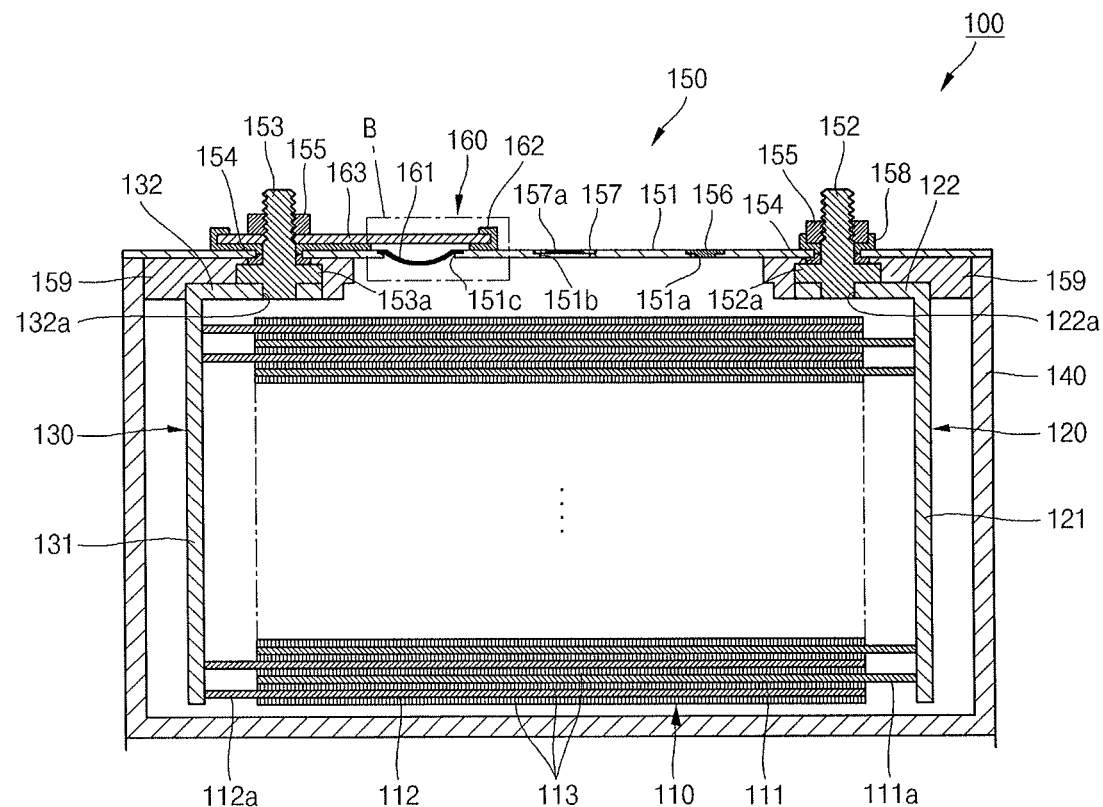
FIG. 2 illustrates a view along section line A-A' of FIG. 1.
Figure 3A:
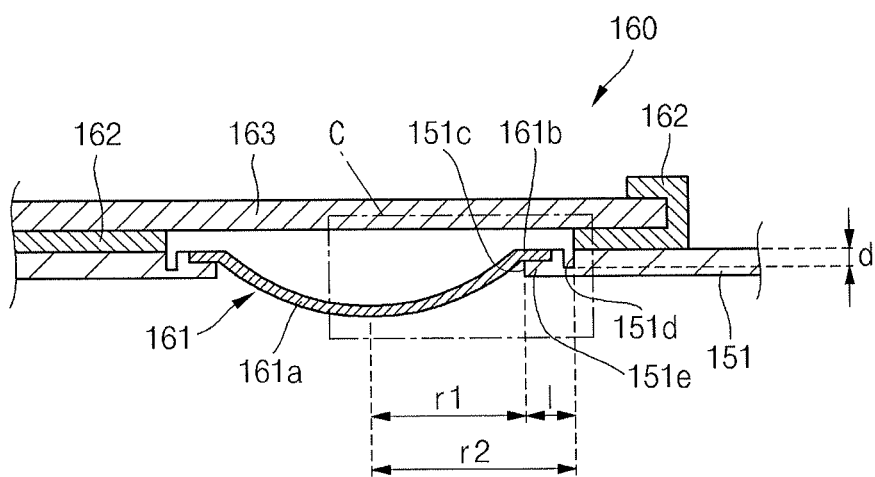
FIG. 3A illustrates an enlarged view depicting a portion B of FIG. 2.
Figure 3B:
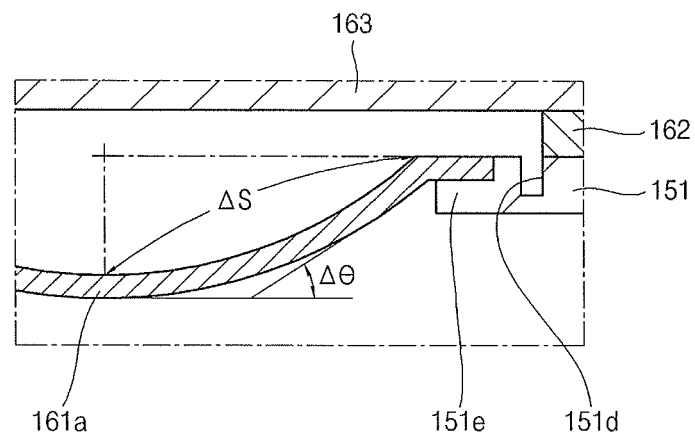
FIG. 3B illustrates an enlarged view depicting a portion C of FIG. 3A.
Figure 4:
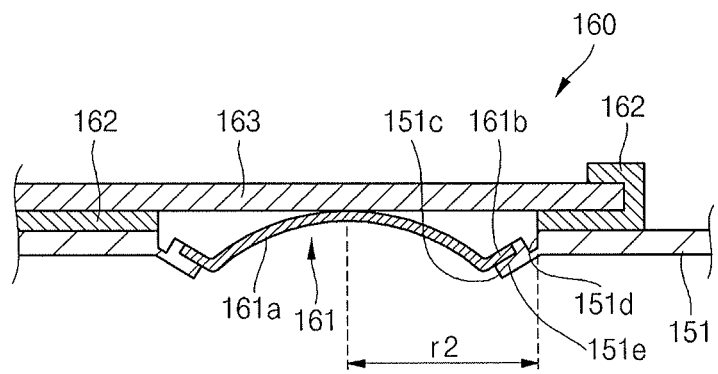
FIG. 4 illustrates an inversion plate in the secondary battery in FIG. 1.

FIG. 1 illustrates an embodiment of a secondary battery 100, FIG. 2 illustrates a sectional view taken along line A-A' in FIG. 1, FIG. 3A illustrates an enlarged view depicting portion B in FIG. 2, FIG. 3B illustrates an enlarged view depicting portion C in FIG. 3A, and FIG. 4 illustrates a sectional view depicting a state in which an inversion plate is inverted in the secondary battery in FIG. 1.

Referring to FIGS. 1 to 4, the secondary battery 100 includes an electrode assembly 110, a first collector plate 120, a collector plate 130, a case 140, a cap assembly 150, and a short-circuit member 160.

The electrode assembly 110 may be formed by winding or stacking a structure of a first electrode plate 111, a separator 113, and a second electrode plate 112, which, for example, may be formed of a thin plate or layer. The first electrode plate 111 may serve as a positive electrode and the second electrode plate 112 may serve as a negative electrode, or vice versa.

The first electrode plate 111 may be formed, for example, by coating a first electrode active material, such as a transition metal, on a first electrode collector formed of a metal foil, for example, made of aluminum. The first electrode plate 111 may include a first electrode uncoated portion 111a where the first electrode active material is not applied. The first electrode uncoated portion 111a may function as a passage for current flowing between the first electrode plate 111 and an exterior of the first electrode plate 111.

The second electrode plate 112 may be formed by coating a second electrode active material, such as a graphite or carbon, on a second electrode collector formed of a metal foil, for example, made of nickel or copper. The second electrode plate 112 may include a second electrode uncoated portion 112a where the second electrode active material is not applied at the other end opposite to the end having the first electrode uncoated portion 111a. The second electrode uncoated portion 112a may function as a passage for current flowing between the second electrode plate 112 and an exterior of the second electrode plate 112.

The first electrode plate 111 and the second electrode plate 112 may be disposed by changing their polarities.

The separator 113 may be positioned between the first electrode plate 111 and the second electrode plate 112 to prevent electrical short circuits and to allow movement of lithium ions. The separator 113 may be made, for example, of polyethylene, polypropylene, a copolymer of polypropylene and polyethylene, and/or another material.

The first collector plate 120 is made of a conductive material (e.g., aluminum), which makes contact with the first electrode uncoated portion 111a. The first electrode uncoated portion 111a protrudes at one end of the electrode assembly 110 to be electrically connected to the first electrode plate 111.

The first collector plate 120 includes a coupling part 121 and a bent part 122.

The coupling part 121 has a plate shape and makes contact with the first electrode uncoated portion 111a. The coupling part 121 is electrically connected to the first electrode uncoated portion 111a and provides an electric path in which the first electrode uncoated portion 111a is connected to the exterior side.

The bent part 122 has a plate shape which is bent approximately 90 degrees from the coupling part 121 and is installed between a top portion of the electrode assembly 110 and the cap assembly 150. The bent part 122 includes a terminal hole 122a. The terminal hole 122a is formed at one side of the bent part 122 and provides a space into which a first electrode terminal 152 of the cap assembly 150 is fitted for coupling.

In addition, at least a portion of the first collector plate 120 is formed to have a smaller thickness than another portion of the bent part 122, to thereby form a fuse part. As a result, according to the present embodiment, when the internal pressure of the secondary battery 100 rises to make the inversion plate 161 of the short-circuit member 160 inverted, an internal electrical short circuit is formed. In this case, the fuse part may be broken due to induced overcurrent. Therefore, a connection between the first collector plate 120 and the first electrode terminal 152 is broken, thereby interrupting charging and discharging in a subsequent process and ultimately securing safety.

The second collector plate 130 is made of a conductive metal (e.g., nickel), and makes contact with the second electrode uncoated portion 112a protruding at the other end of the electrode assembly 110 for electrical connection to the second electrode plate 112. The second collector plate 130 includes a coupling part 131 and a bent part 132. In addition, a terminal hole 132a to be coupled to the second electrode terminal 153 is formed at the bent part 132.

The coupling part 131, the bent part 132, and the terminal hole 132a of the second collector plate 130 may be substantially the same as the coupling part 121, the bent part 122, and the terminal hole 122a of the first collector plate 120 in terms of configuration and function.

The case 140 may be made of a conductive metal, e.g., aluminum, aluminum alloy, or nickel plated steel. The case 140 may have an approximately hexahedral shape with an opening to receive and mount the electrode assembly 110, the first collector plate 120, and the second collector plate 130. In the embodiment of FIG. 2, the case 140 and the cap assembly 150 are coupled to each other. As a result, the opening is not illustrated. The opening may correspond to a substantially opened edge portion of the cap assembly 150.

The internal surface of the case 140 is insulated, and thus is insulated from the electrode assembly 110, the first collector plate 120, the second collector plate 130, and the cap assembly 150. In addition, the case 140 may have one polarity, for example, the polarity of a positive electrode.

The cap assembly 150 is combined with the case 140. For example, the cap assembly 150 may include a cap plate 151, a first electrode terminal 152, a second electrode terminal 153, a gasket 154, and a nut 155. In addition, the cap assembly 150 may include a plug 156, a safety vent 157, a connection member 158, and a fixing member 159.

The cap plate 151 may seal the case 140 and, for example, may be made of the same material as the case 140. The cap plate 151 may include an injection hole 151a, a vent hole 151b, and a short-circuit hole 151c. In addition, the cap plate 151 includes a deformation inducing groove 151d, formed in the vicinity of the short-circuit hole 151c and spaced apart from the short-circuit hole 151c, and a coupling region 151e formed inside the deformation inducing groove 151d.

The injection hole 151a of the cap plate 151 provides a passage for injecting an electrolyte solution into the case 140. The injection hole 151a may be plugged by the plug 156 once the electrolyte solution is injected.

The vent hole 151b is positioned under the safety vent 157, so that a thickness of the safety vent 157 is less than thicknesses of one or more other portions of the cap plate 151. As a result, when the internal pressure of the case 140 exceeds a predetermined level, the safety vent 157 may open before other portions of the cap plate 151, to thereby prevent the secondary battery 100 from exploding.

The short-circuit hole 151c forms an opened portion in the cap plate 151 to allow the internal pressure of the case 140 to be transmitted to the short-circuit member 160.

The deformation inducing groove 151d is formed on a top surface of the cap plate 151 along or adjacent the periphery of the short-circuit hole 151c. The deformation inducing groove 151d is spaced a predetermined distance from the short-circuit hole 151c. A coupling region 151e may be formed adjacent the deformation inducing groove 151d and may reach the short-circuit hole 151c.

The inversion plate 161 of the short-circuit member 160 is coupled to the coupling region 151e, and may therefore seal the short-circuit hole 151c. The deformation inducing groove 151d provides a degree of freedom to the coupling region 151e, to thereby allow the inversion plate 161 coupled to the coupling region 151e to be more easily inverted. For example, as the internal pressure of the case 140 rises, a force applied to the inversion plate 161 increases. The inversion plate 161 inverts when the internal pressure of the case 140 exceeds a predetermined level.

In order to reduce contact resistance between the inversion plate 161 and the short-circuit plate 163 when current is applied after the inversion plate 161 is inverted, the inversion plate 161 may be made to have a large curvature. For example, as shown in FIG. 3B, the curvature may be defined as a ratio ($d\Delta\theta/d\Delta s$) of an angle ($\Delta\theta$) formed between tangents at a point on a curve of the inversion plate 161 and a lowest point of the inversion plate 161 to a distance ($\Delta s$) moving along the curve from the point on the curve. The larger the curvature of the inversion plate 161, the more convexly curved the inversion plate 161 is downwardly. Therefore, the larger the curvature of the inversion plate 161, the larger the contact area and the contact force with respect to the short-circuit plate 163 after the inversion plate 161 is inverted This allows for a reduction in contact resistance.

However, a region in which the inversion plate 161 is coupled to the coupling region 151e is limited. Also, a considerable pressure may be required to invert the inversion plate 161 due to the large curvature of the inversion plate 161 under some circumstances. In addition, in order to maintain a short-circuited state when the inversion plate 161 is inverted, the inversion plate 161 may have a predetermined thickness or greater, so that there is a limit to increasing the curvature.

In the cap plate 151, the coupling region 151e may also be deformed by the deformation inducing groove 151d when the inversion plate 161 is inverted. For example, when the internal pressure exceeds a predetermined level of internal pressure, an inversion operation starts through deformation of the coupling region 151e bent toward the inside of the case 140.

In addition, the deformation of the coupling region 151d may induce the inversion plate 161 to be easily inverted. To this end, a depth d of the deformation inducing groove 151d may be half ($\frac{1}{2}$) or less a thickness of the cap plate 151. When the depth d of the deformation inducing groove 151d is half ($\frac{1}{2}$) or less the thickness of the cap plate 151, the coupling region 151e may be inwardly deformed toward the case 140 under an internal pressure greater than or equal to a predetermined level, while securing mechanical strength of the cap plate 151 and the deformation inducing groove 151d.

In addition, the inversion plate 161 may have an increased diameter r2, compared to its diameter r1, by as much as a length l of the coupling region 151e of the cap plate 151. Therefore, because the inversion plate 161 is more easily inverted, it is possible to obtain a curvature of a predetermined level required to reduce the contact resistance.

The first electrode terminal 152 passes through one side of the cap plate 151 and is electrically connected to the first collector plate 120. The first electrode terminal 152 may have a pillar shape. A screw thread may be formed on an outer circumferential edge of an upper pillar exposed to an upper portion of the cap plate 151. A flange 152a is formed at a lower pillar positioned at a lower portion of the cap plate 151. The flange may prevent the first electrode terminal 152 from being dislodged from the cap plate 151. A portion of the first electrode terminal 152 positioned at a lower portion of the flange 152a is fitted into the terminal hole 122a of the first collector plate 120. The first electrode terminal 152 may be electrically connected to the cap plate 151.

The second electrode terminal 153 passes through the other side of the cap plate 151 and is electrically connected to the second collector plate 130. The second electrode terminal 153 may have the same configuration as the first electrode terminal 152. The second electrode terminal 153 is insulated from the cap plate 151.

The gaskets 154 may be made of an insulating material and may be positioned between the cap plate 151 and respective ones the first electrode terminal 152 and the second electrode terminal 153. The gaskets 154 may seal a space between respective ones of the electrode terminals 152 and 53 and the cap plate 151. For example, the gaskets 154 may prevent external moisture from being introduced into the secondary battery 100, and/or may prevent leakage of electrolyte solution from the secondary battery 100.

The nut 155 may be coupled to the screw thread formed on each of the first electrode terminal 152 and the second electrode terminal 153. The nut 155 may fix each of the first electrode terminal 152 and the second electrode terminal 153 to the cap plate 151.

The plug 156 seals the electrolyte injection hole 151a of the cap plate 151. In addition, the vent plate 157 is installed in the vent hole 151b of the cap plate 151, and may include a notch 157a which opens at a predetermined pressure.

The connection plate 158 is inserted between the first electrode terminal 152 and the cap plate 151, to make close contact with the cap plate 151 and the gasket 154 through the nut 155. The connection plate 158 electrically connects the first electrode terminal 152 to the cap plate 151.

The fixing members 159 are formed between the cap plate 151 and respective ones of the first collector plate 120 and the second collector plate 130, fixes positions of the first and second collector plates 120 and 130 respectively, and prevents an electrical short circuit from occurring.

The short-circuit member 160 is installed on the cap assembly 150. The short-circuit member 160 induces a short circuit when the internal pressure of the secondary battery 100 exceeds a predetermined reference pressure due to over-charging. The short-circuit cuts off the fuse part of the first collector plate 120, to thereby block the flow of current. The short-circuit member 160 includes the inversion plate 161 and the short-circuit plate 163, which is made of a conductive material. The short-circuit member 160 further includes an insulation member 162 formed along the edge of the short-circuit plate 163 to insulate the short-circuit plate 163 from the cap plate 151.

The inversion plate 161 covers the short-circuit hole 151c of the cap plate 151, and is electrically connected to the cap plate 151. In addition, the inversion plate 161 has a curvature and is convexly formed toward the interior of the case 140. When the internal pressure of the case 140 exceeds the predetermined reference pressure, the inversion plate 161 inverts to be upwardly convex. The inversion plate 161 establishes a electrical connection with the short-circuit plate 163 in the inverted position. The inversion plate 161 may be made of aluminum or another conductive material.

The inversion plate 161 includes a downwardly convex inversion part 161a and an edge part 161b coupled to the coupling region 151e of the cap plate 151.

The inversion part 161a is convexly formed toward the interior of the case 140. The inversion part 161a is configured to surround the short-circuit hole 151c of the cap plate 151, in order to seal the short-circuit hole 151c. The inversion part 161a has an elasticity of a predetermined degree and is inverted when the internal pressure of the case 140 exceeds the predetermined reference pressure. The inversion part 161a is electrically connected to the cap plate 151 at times of normal operation and is maintained in a state electrically insulated from the short-circuit plate 163. However, when the inversion part 161a is inverted, an upper portion of the inversion part 161a comes into contact with short-circuit plate 163, to establish electrical connection with the short-circuit plate 163. As a result, the cap plate 151 and the short-circuit plate 163 are electrically connected to each other.

In addition, because the cap plate 151 is connected to the first electrode terminal 152 and the short-circuit plate 163 is connected to the second electrode terminal 153, the first electrode terminal 152 and the second electrode terminal 153 are electrically short-circuited when the inversion part 161a is inverted. Therefore, an internal short circuit is caused and an over-current may flow. In addition, as described above, the fuse part of the first collector plate 120 is cut off to interrupt charging and discharging, thereby eliminating a risk of explosion of the secondary battery 100.

The edge part 161b is formed at an edge of the inversion part 161a. The edge part 161b fixes the inversion part 161a to the coupling region 151e of the cap plate 151. Therefore, the edge part 161b supports the inversion part 161a to allow for stable inversion.

The edge part 161b may be coupled to a side surface boundary contiguous to the cap plate 151, for example, by welding. The welding may be performed, for example, by pulse welding. Alternatively, the welding may be performed by continuous welding or another type of welding.

The insulation member 162 is formed between the second electrode terminal 153 and the cap plate 151. The insulation member 162 makes close contact with the cap plate 151 and the gasket 154 around the second electrode terminal 153 to establish a seal. In addition, the insulation member 162 surrounds peripheral regions of the short-circuit plate 163, connected to the second electrode terminal 153, to separate the short-circuit plate 163 from the cap plate 151 for electrical insulation.

The short-circuit plate 163 is formed to allow the second electrode terminal 153 to be fitted from the exterior side spaced apart from the cap plate 151, and extends to a region corresponding to an upper portion of the short-circuit hole 151c. The short-circuit plate 163 is electrically connected to the second electrode terminal 153. Here, the short-circuit plate 163 may have a top surface and a bottom surface which are planar, and may be made of copper or another conductive material.

In addition, an air hole may be included to exhaust air present between the inversion plate 161 and the short-circuit plate 263. The air hole may be included in at least one of the insulation member 162 or the short-circuit plate 163. Therefore, when the inversion plate 161 is inverted, air is allowed to be exhausted to thereby facilitate the inversion operation.

As described above, because the deformation inducing groove 151d is formed in the vicinity of the short-circuit hole 151c of the cap plate 151, and because the coupling region 151e coupled to the inversion plate 161 is formed within the cap plate 151, the deformation inducing groove 151d is primarily deformed under an internal pressure greater than or equal to a predetermined level. As a result, the inversion plate 161 is allowed to be easily inverted.

In addition, inversion of the inversion plate 161 is induced by the deformation inducing groove 151d. This allows the inversion plate 161 to have a predetermined curvature, which allows for a reduction in contact resistance between the inversion plate 161 and the short-circuit plate 163 when the inversion plate 161 is inverted. As a result, stability of the secondary battery 100 is secured.

Figure 5A:
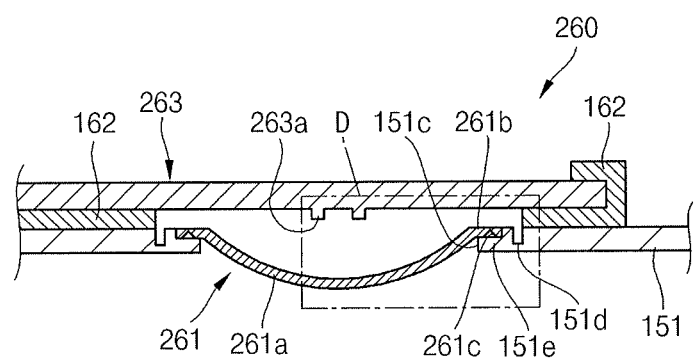
FIG. 5A illustrates another embodiment of a secondary battery.
Figure 5B:
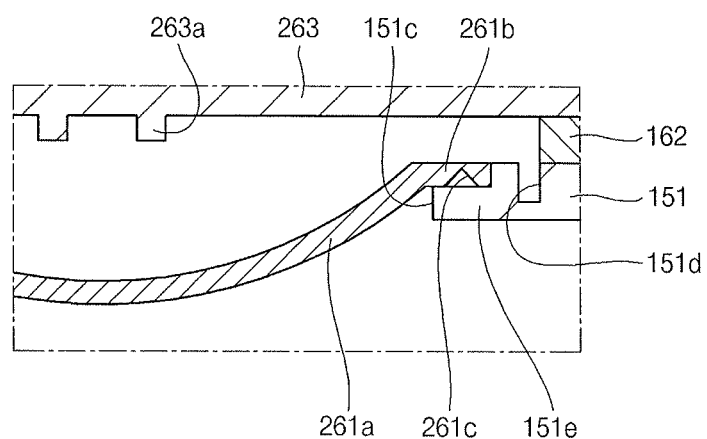
FIG. 5B illustrates an enlarged view depicting a portion D of FIG. 5A.
Figure 6:
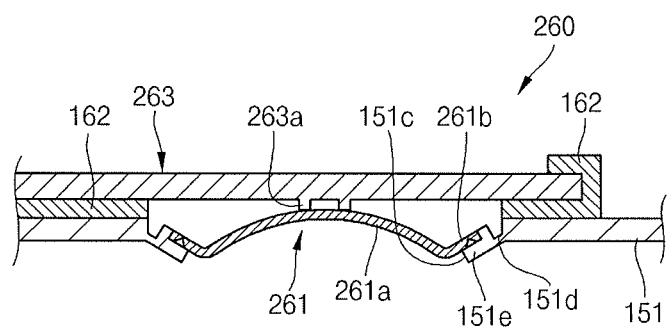
FIG. 6 illustrates an inversion plate in the secondary battery in FIG. 5A.

FIG. 5A illustrates a partially enlarged view of another embodiment of a secondary battery, FIG. 5B illustrates an enlarged view depicting portion D in FIG. 5A, and FIG. 6 illustrates a sectional view depicting a state in which an inversion plate is inverted in the secondary battery in FIG. 5A. This embodiment of the secondary battery may be substantially the same as the previous embodiment, except for the structure of a short-circuit member 260.

Referring to FIGS. 5A to 6, the short-circuit member 260 includes an inversion plate 261, an insulation member 162, and a short-circuit plate 263. In addition, the inversion plate 261 includes an inversion part 261a and an edge part 261b. A notch 261c is formed on a bottom surface of the inversion plate 261, on which the edge part 261b is coupled to a coupling region 151e of the assembly 150. The edge part 261b of the short-circuit member 260 increases the degree of freedom of operation of the inversion plate 261 through the notch 261c, to thereby allow the inversion plate 261 to be easily inverted at a predetermined pressure.

The short-circuit plate 263 may further include a contact protrusion 263a on its bottom surface. The contact protrusion 263a is formed to correspond to the inversion plate 261, so as to make contact with the inversion plate 261 when the inversion plate 261 is inverted. The contact protrusion 263a induces a contact state of a predetermined area with respect to the inversion plate 261, thereby maintaining contact resistance at a constant level and maintaining the inversion plate 261 in a stable contact state.

By way of summation and review, when an internal pressure of a secondary battery rises as a result of excess heat generated by over-charging or decomposition of the electrolytic solution, fire or an explosion may occur. In accordance with one or more of the aforementioned embodiments, a secondary battery is protected by including a structure which causes an electrical short circuit to one or more electrodes when an internal pressure of a case increases due to over-charging or other effects.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly including a first electrode plate and a second electrode plate;
   a case accommodating the electrode assembly;
   a cap assembly to seal the case, the cap assembly having a short-circuit hole and a cap plate electrically connected to the first electrode plate;
   an inversion plate including an inversion section positioned in the short-circuit hole and bent toward the case, and an edge section at an edge of the inversion section and coupled to the cap plate; and
   a short-circuit plate adjacent the short-circuit hole and spaced from the cap plate, the short-circuit plate electrically connected to the second electrode plate, wherein the cap assembly includes a groove adjacent to and spaced from the short-circuit hole and spaced from the inversion plate, the groove is in an upper surface of the cap assembly and including a surface below an upper surface of the inversion plate configured to allow for deformation of a portion of the cap assembly when the inversion plate is inverted, a bottom of the groove below a portion of the upper surface of the cap assembly between the groove and the inversion plate, and wherein the groove is spaced from an edge part of the inversion plate.

2. The secondary battery as claimed in claim 1, wherein a depth of the groove is about half or less of a thickness of the cap assembly.

3. The secondary battery as claimed in claim 1, wherein the groove has a shaped which substantially conforms with the short-circuit hole.

4. The secondary battery as claimed in claim 1, wherein:
   the cap assembly includes a coupling region in contact with the inversion plate, and the coupling region is configured to deform to face the case when the inversion plate is inverted, the coupling region allowed to deform based on the groove.

5. The secondary battery as claimed in claim 4, wherein the coupling region is welded and coupled to the inversion plate.

6. The secondary battery as claimed in claim 1, wherein the inversion plate includes a surface having a notch coupled to the cap assembly.

7. The secondary battery as claimed in claim 6, wherein the notch is on a surface of the inversion plate contacting the cap assembly.

8. The secondary battery as claimed in claim 1, wherein the short-circuit plate includes a protrusion which protrudes from a surface facing the inversion plate.

9. The secondary battery as claimed in claim 8, wherein the protrusion contacts the inversion plate when the inversion plate is inverted.

10. The secondary battery as claimed in claim 1, further comprising:
    an air hole between the inversion plate and the short-circuit plate,
    wherein the air hole is in an insulation member adjacent the short-circuit plate.

* * * * *